A. COLLIER.
SPOKE AND TIRE FOR AUTOMOBILE AND TRUCK WHEELS.
APPLICATION FILED AUG. 29, 1919.
1,329,111.
Patented Jan. 27, 1920.
2 SHEETS—SHEET 1.
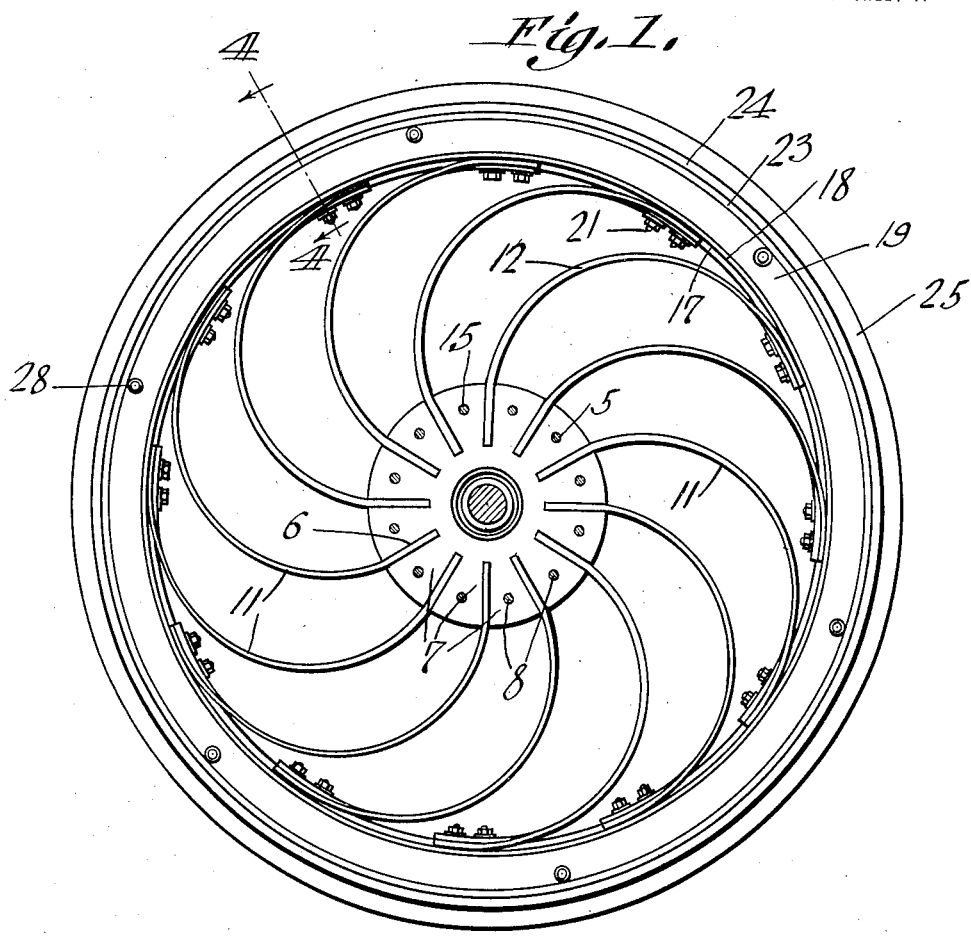
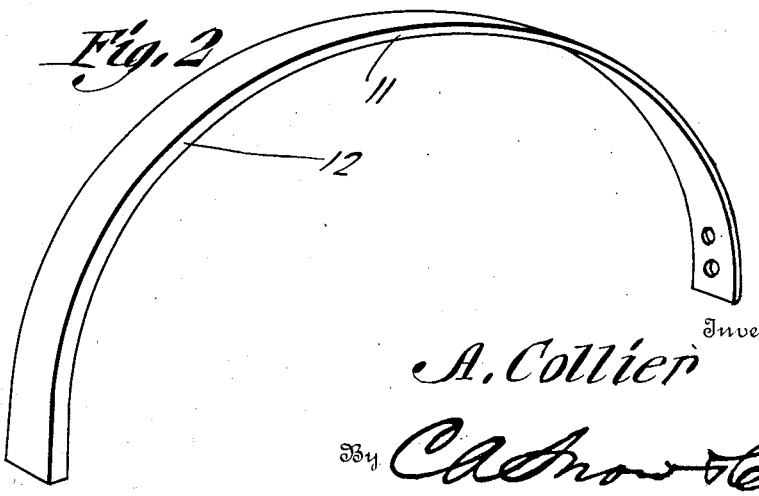

A. COLLIER.
SPOKE AND TIRE FOR AUTOMOBILE AND TRUCK WHEELS.
APPLICATION FILED AUG. 29, 1919.
1,329,111. Patented Jan. 27, 1920.
2 SHEETS—SHEET 2.
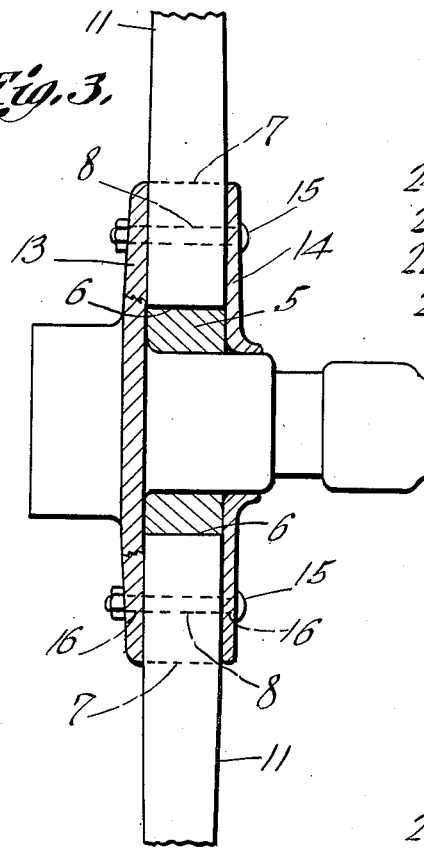
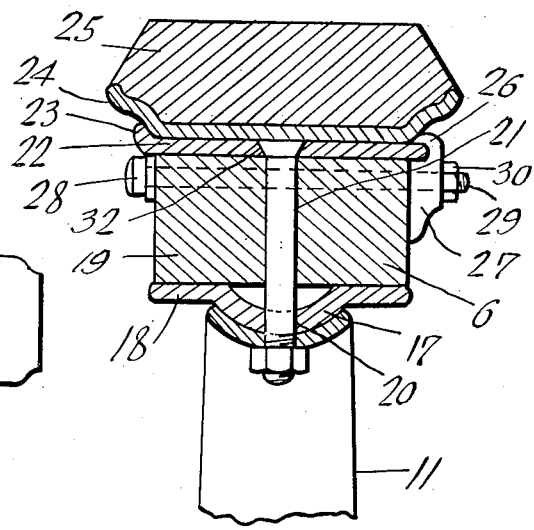
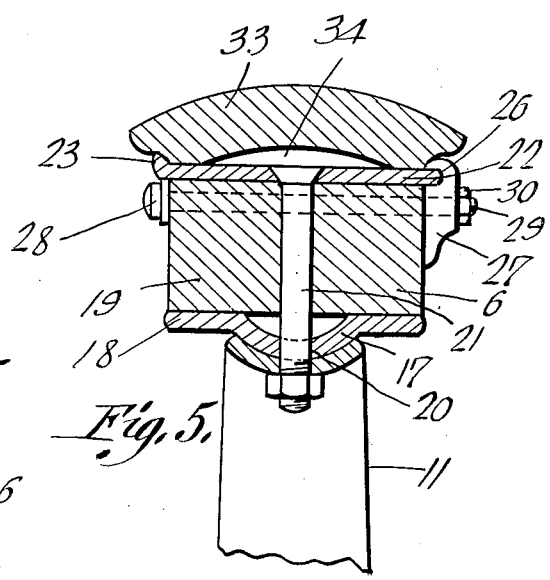
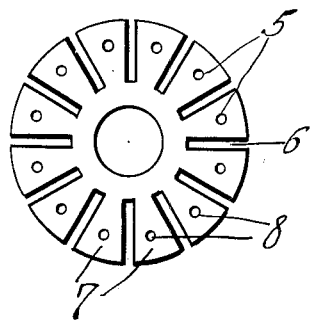
Witness
Inventor
A. Collier
By C. A. Snow & Co.
Attorneys

UNITED STATES PATENT OFFICE.

AARON COLLIER, OF PETTY, TEXAS.

SPOKE AND TIRE FOR AUTOMOBILE AND TRUCK WHEELS.

1,329,111.  Specification of Letters Patent.  Patented Jan. 27, 1920.

Application filed August 29, 1919. Serial No. 320,627.

*To all whom it may concern:*

Be it known that I, AARON COLLIER, a citizen of the United States, residing at Petty, in the county of Lamar and State of Texas, have invented a new and useful Spoke and Tire for Automobile and Truck Wheels, of which the following is a specification.

This invention relates to wheel construction, and more particularly to the construction of wheels employed in connection with automobiles, trucks and the like, or in brief, wheels known in the art, as spring wheels.

The primary object of the invention is to provide a spring wheel construction including one piece, resilient spoke members, which absorb the shocks and jars, usually compensated for by the well known pneumatic tire, now in use.

A further object of the invention is to provide means for facilitating the quick and easy removal of a spoke, in the event that the same becomes broken, or otherwise rendered inoperative.

A still further object of the invention is to provide means for detachably securing the tire to the rim, since it is within the scope of the present invention to employ either a steel tire or a rubber tire.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring now to the drawings:—

Figure 1 illustrates a side elevational view of a wheel constructed in accordance with the present invention, the same being shown as being partly in section;

Fig. 2 illustrates a perspective view of one of the metallic spokes;

Fig. 3 illustrates a sectional view through a portion of a wheel.

Fig. 4 illustrates a sectional view taken on line 4—4 of Fig. 1.

Fig. 5 illustrates a sectional view through a form of tire securing means, the same being used in combination with a steel tire.

Fig. 6 illustrates a side elevational view of the hub.

Having reference to the drawings in detail, the reference character 5 designates the disk-like hub of the wheel, which as shown is substantially thick, and provided with a plurality of radiating slots 6, forming radiating segments 7, apertured as at 8 for purposes to be hereinafter more fully described.

The slots 6, extend inwardly from the periphery of the hub 5, and terminate at points in close proximity to the central bearing opening, formed in the hub.

The spokes 11, forming an important feature of the invention, include the curved metallic spring members 12, and have their inner ends positioned within the radiating slots 6, the widths of the spokes 12 being slightly greater than the thickness of the disk-like hub 5, so that the side edges thereof extend beyond the side faces of the hub 5, to permit the disk-like securing plates 13 and 14, to closely engage the same, when the disks are positioned on the side faces of the hub 5.

Bolts 15, pass through the openings 16, formed in the securing plates 13 and 14, which openings, are disposed in the plates 13 and 14 to permit the same to register with the openings 8 of the segments 7, and it is obvious, that due to this construction, movement of the spokes 11 at their points of connection with the hub 5, is absolutely prevented.

The outer ends, of the respective spokes 11, are curved transversely of their widths, to engage the curved portion 17 of the metallic band 18, which is secured to the inner periphery of the felly 19, which is formed of wood, or other suitable material, the curved portions of the spokes 11, being also apertured to register with openings 20, formed in the metallic band 18, to receive the securing bolts 21, passing through the felly 19, for securing the spokes and metallic band 18, to the felly 19, of the wheel proper.

A circular metallic plate 22, is mounted on the outer periphery of the felly 19, and is of a width, greater than the width of the felly 19, one edge thereof extending upwardly as at 23, to provide an abutment, for the metallic base 24, which supports a rubber tire 25, and prevents lateral displacement of the rubber tire 25, with relation to the felly 19.

The opposite edge of the metallic plate 22 extends beyond the side plate of the felly 19, and receives the hooked portion 26, of the removable securing member 27, which as shown is provided with an aperture to receive the transversely extending bolt 28, passing through the felly 19, the threaded portion 29 thereof, coöperating with the nut 30, for securing the member 27, to the felly.

In this form of invention, the metallic plate 22 is provided with an aperture 32, for accommodating the upper end of the securing bolt 21. From the foregoing it will be seen that, due to this construction, the plate 22, is rigidly secured to the felly, by the same securing means which secures the spokes thereto.

In the form shown by Fig. 5 of the drawings, I have eliminated the use of the rubber tire, and shown a construction capable of efficiently supporting a steel tire, the steel tire being shown at 33. This tire which is used preferably on country roads where a slight rattling or noise is not objectionable, is curved transversely of its width, to provide a space 34, and supports the central portion of the tire 33 in spaced relation with the metallic plate 22, with the result that the spring wheel construction, in combination with the steel tire 33, accomplishes the identical result, as would the pneumatic tires, now in use.

As shown, in this construction, the metallic plate 22, or the upwardly extending flange 23 thereof, engages one edge of the tire 33, while the securing member 27, engages the opposite side edge of the tire, for preventing lateral displacement thereof.

Having thus described the invention, what is claimed is:—

In a spring wheel construction, a felly, a removable inner section including a metallic band of a width equal to the width of the felly, said metallic band having an annular rib formed intermediate its width to provide lateral flanges, a hub, a plurality of curved spokes, secured to the hub, one extremity of each of the spokes being curved transversely of its length to conform to the curvature of the rib for securing the spokes against lateral displacement, and means extending through the felly band and spokes for securing the spokes and band to the felly.

In testimony that I claim the foregoing as my own, I have hereto affixed my signature in the presence of two witnesses.

AARON COLLIER.

Witnesses:
D. C. SPEARS,
R. M. HODGES.